US009621638B2

(12) United States Patent
Wu et al.

(10) Patent No.: US 9,621,638 B2
(45) Date of Patent: Apr. 11, 2017

(54) METHOD, SYSTEM, AND APPARATUS FOR SHARING APPLICATION INFORMATION

(71) Applicant: Tencent Technology (Shenzhen) Company Limited, Shenzhen (CN)

(72) Inventors: Xuezhu Wu, Guangdong (CN); Shengwei Lin, Guangdong (CN); Xing Shao, Guangdong (CN); Lifei Xiang, Shenzhen (CN); Deliang Zhu, Shenzhen (CN); Yusheng Zhong, Shenzhen (CN); Siying Tan, Shenzhen (CN); Liang Yu, Shenzhen (CN); Jing Lv, Shenzhen (CN); Tao Zhu, Shenzhen (CN); Zhenyu Wu, Shenzhen (CN); Jun Huang, Shenzhen (CN); Jia Zeng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 471 days.

(21) Appl. No.: 14/457,975

(22) Filed: Aug. 12, 2014

(65) Prior Publication Data

US 2014/0351344 A1 Nov. 27, 2014

Related U.S. Application Data

(63) Continuation of application No. PCT/CN2013/074997, filed on Apr. 28, 2013.

(30) Foreign Application Priority Data

May 3, 2012 (CN) .......................... 2012 1 0134439

(51) Int. Cl.
*H04L 29/08* (2006.01)
*H04W 4/00* (2009.01)
(Continued)

(52) U.S. Cl.
CPC .............. *H04L 67/10* (2013.01); *H04L 67/28* (2013.01); *H04L 67/34* (2013.01); *H04W 4/001* (2013.01);
(Continued)

(58) Field of Classification Search
None
See application file for complete search history.

(56) References Cited

U.S. PATENT DOCUMENTS 5,922,040 A * 7/1999 Prabhakaran .......... G08G 1/127
340/990
6,026,345 A * 2/2000 Shah ................... G01C 21/3446
340/995.18
(Continued)

FOREIGN PATENT DOCUMENTS

CN 101409868 A 4/2009
CN 102325172 A 1/2012
(Continued)

OTHER PUBLICATIONS

Office Action dated Oct. 14, 2015 for Korean Application No. 10-2014-7007533, 6 pages.
(Continued)

*Primary Examiner* — Ranodhi Serrao
(74) *Attorney, Agent, or Firm* — Brinks Gilson & Lione

(57) ABSTRACT

A method, a system, and an apparatus are provided for sharing application information. The method receives match request sent by a mobile terminal X upon receipt of a share instruction of a user. According to the match request, the method determines whether there is a mobile terminal that is matched with the mobile terminal X among other mobile terminals that send match request, and if a mobile terminal is found, sends a success message. When a server receives identifiers of applications to be shared sent from any one
(Continued)

mobile terminal of the matched mobile terminals, the method determines whether the other mobile terminal of the matched mobile terminals is connected to the server, if the other mobile terminal is online, obtains relevant information of the application corresponding to each identifier respectively, and sends the obtained relevant information to the other mobile terminal.

15 Claims, 3 Drawing Sheets

(51) Int. Cl.
    *H04W 4/20* (2009.01)
    *H04W 4/02* (2009.01)
(52) U.S. Cl.
    CPC ............ *H04L 67/24* (2013.01); *H04W 4/023* (2013.01); *H04W 4/206* (2013.01)

(56) References Cited

U.S. PATENT DOCUMENTS

| | | | | |
|---|---|---|---|---|
| 6,029,064 A | * | 2/2000 | Farris | H04M 11/08 455/412.2 |
| 6,151,491 A | * | 11/2000 | Farris | H04W 4/06 455/412.2 |
| 6,160,804 A | * | 12/2000 | Ahmed | H04L 29/12009 370/349 |
| 6,167,253 A | * | 12/2000 | Farris | H04M 11/08 455/412.2 |
| 6,256,300 B1 | * | 7/2001 | Ahmed | H04L 29/12009 370/331 |
| 2002/0080752 A1 | * | 6/2002 | Johansson | H04L 29/06 370/338 |
| 2002/0118664 A1 | * | 8/2002 | Ishibashi | H04W 48/20 370/338 |
| 2002/0188702 A1 | * | 12/2002 | Short, III | G01C 21/36 709/220 |
| 2003/0039237 A1 | * | 2/2003 | Forslow | H04W 28/18 370/352 |
| 2011/0142016 A1 | | 6/2011 | Chatterjee | |

FOREIGN PATENT DOCUMENTS

| | | |
|---|---|---|
| CN | 102427377 A | 4/2012 |
| CN | 102638586 A | 8/2012 |
| GB | 2470811 A | 12/2010 |
| JP | 2009239431 A | 10/2009 |
| JP | 2010056641 A | 3/2010 |
| JP | 2010114727 A | 5/2010 |
| WO | WO 2010/131465 A1 | 11/2010 |
| WO | WO 2012/035149 A1 | 3/2012 |

OTHER PUBLICATIONS

Search Report to European Patent Application No. 13785255.4-1870/2745496, dated Feb. 20, 2015, (7p).
Japanese Office Action corresponding to JP 2014-521947, dated Jan. 13, 2015, (3p).
International Search Report to PCT Application No. PCT/CN2013/074997 dated Aug. 8, 2013, 9p.

* cited by examiner

| A server receives a match request sent by a mobile terminal X upon receipt of a share instruction, the match request at least comprising information indicative of a first time at which the mobile terminal X receives the share instruction. | — 11 |

| The server saves the match request; determines, according to the saved match request and other saved match requests from other mobile terminals, whether there is a mobile terminal, among the other mobile terminals, which is matched with the mobile terminal X ; wherein the step of determining whether there is a mobile terminal which is matched with the mobile terminal X among the other mobile terminals includes: if a time interval between a second time at which one mobile terminal of the other mobile terminals receives a share instruction of a user of the one mobile terminal and the first time is within a range [0, M], where M > 0, determining that the mobile terminal is matched with the mobile terminal X; and if a mobile terminal which is matched with the mobile terminal X is found, sends a success message to the mobile terminal X and the mobile terminal which is matched with the mobile terminal X respectively for prompting that they are successfully matched with each other. | — 12 |

| The server determines upon a condition that the server receives identifiers of applications to be shared and sent from one mobile terminal of the matched mobile terminals constituted by the mobile terminals constituted by the mobile terminal X and the mobile terminal that is matched with the mobile terminal X, whether the other mobile terminal of the matched mobile terminals is connected to the server; if the other mobile terminal of the matched mobile terminals is disconnected from the server, notifies the one mobile terminal that the other mobile terminal of the matched mobile terminals is disconnected from matching; and if the other mobile terminal of the matched mobile terminals is online, obtains relevant information of the application corresponding to each identifier, and sends the obtained relevant information to the other mobile terminal of the matched mobile terminals, wherein the relevant information at least comprises a name and a download address of the application | — 13 |

FIG. 1

METHOD, SYSTEM, AND APPARATUS FOR SHARING APPLICATION INFORMATION

CROSS-REFERENCE TO RELATED APPLICATIONS

This application is a continuation of International Application No. PCT/CN2013/074997, filed on Apr. 28, 2013, which claims priority to Chinese Patent Application No. 2012101344394, filed with the Chinese Patent Office on May 3, 2012 and entitled "METHOD, SYSTEM, AND APPARATUS FOR SHARING APPLICATION INFORMATION", both of which are hereby incorporated by reference in their entireties.

FIELD OF THE TECHNOLOGY

The present disclosure relates to network technologies, and in particular, to a method, a system, and an apparatus for sharing application information.

BACKGROUND

In the prior art, a user may install various applications on a mobile terminal he or she uses. If the user thinks that an application is of high performance or is practical, the user may want to share the application with another user, for example, share the application with a friend of the user.

An existing sharing method is primarily sharing information such as a name and a download address of the application by transferring texts via a specific personal account. For example, the user shares information such as the name and the download address of the application to be shared to a friend of the user via email or micro-blog.

However, there are some problems in an actual process of using the above method, for example, the user needs to register and access a personal account of a specified product or a social network, and needs to edit the text. As a result, it is inconvenient and quick enough for implementation. In addition, the shared information cannot be ensured to be timely viewed. For example, a user A shares name and download address information of an application to a user B by using email, then the user B can view the shared information only after accessing his or her email box.

SUMMARY

In view of this, the present disclosure provides a method, a system, and an apparatus for sharing application information, which is convenient and quick for implementation, and enables shared information to be viewed in a timely manner.

In a first aspect, a method for sharing application information among mobile devices is disclosed. The method includes:

receiving, by a server comprising a processor, a match request sent by a mobile terminal X upon receipt of a share instruction, the match request at least comprising information indicative of a first time at which the mobile terminal X receives the share instruction;

saving, by the server, the match request; according to the saved match request and other saved match requests from other mobile terminals, determining whether there is a mobile terminal, among the other mobile terminals, that is matched with the mobile terminal X, where determining whether there is a match comprises: if a time interval between a second time at which one mobile terminal of the other mobile terminals receives a share instruction and the first time is within a range [0, M], where M>0, determining that the one mobile terminal is matched with the mobile terminal X; and if a mobile terminal that is matched with the mobile terminal X is found, sending a success message respectively to the mobile terminal X and to the mobile terminal that is matched with the mobile terminal X, indicating that they are successfully matched with each other; and upon a condition that the server receives identifiers of applications to be shared sent from one mobile terminal of the matched mobile terminals constituted by the mobile terminal X and the mobile terminal that is matched with the mobile terminal X, determining, by the server, whether the other mobile terminal of the matched mobile terminals is connected to the server; if the other mobile terminal is disconnected from the server, notifying the one mobile terminal that the other mobile terminal is disconnected from matching; and if the other mobile terminal is online, obtaining, by the server, relevant information of the application corresponding to each identifier, and sending the obtained relevant information to the other mobile terminal, where the relevant information at least includes a name and a download address of the application.

In a second aspect, a system for sharing application information among mobile devices includes at least two mobile terminals and a server.

A mobile terminal X is configured to send, upon receipt of a share instruction, a match request to the server, the match request at least includes information indicative of a first time at which the mobile terminal X receives the share instruction.

The server is configured to save the match request; according to the saved match request and other saved match requests from other mobile terminals, determine whether there is a mobile terminal, among the other mobile terminals, that is matched with the mobile terminal X; if a mobile terminal which is matched with the mobile terminal X is found, send a success message respectively to the mobile terminal X and to the mobile terminal which is matched with the mobile terminal X, indicating that they are successfully matched with each other; where determining whether there is a match includes: if a time interval between a second time at which one mobile terminal of the other mobile terminals receives a share instruction and the first time is within a range [0, M], where M>0, determine that the one mobile terminal is matched with the mobile terminal X; upon a condition that the server receives identifiers of applications to be shared sent from one mobile terminal of the matched mobile terminals constituted by the mobile terminal X and the mobile terminal that is matched with the mobile terminal X, determine whether the other mobile terminal of the matched mobile terminals is connected to the server; if the other mobile terminal is disconnected from the server, notify the one mobile terminal that the other mobile terminal is disconnected from matching; and if the other mobile terminal is online, obtain relevant information of the application corresponding to each identifier respectively, and send the obtained relevant information to the other mobile terminal, where the relevant information at least includes a name and a download address of the application.

A server includes at least one processor configured to execute a first processing module and a second processing module.

The first processing module is configured to, every time a match request sent by a mobile terminal X upon receipt of a share instruction is received, send the match request to a second processing module, and inform the second processing module to perform functions thereof, where the match request at which the mobile terminal X receives the share instruction.

The second processing module is configured to save the match request; according to the saved match request and other match requests from other mobile terminals, determine whether there is a mobile terminal which is matched with the mobile terminal X among the other mobile terminals, where the determine whether there is a mobile terminal which is matched with the mobile terminal X among the other mobile terminals includes: if a time interval between a second time at which one mobile terminal of the other mobile terminals receives a share instruction of the one mobile terminal and the first time is within a range [0, M], where M>0, determine that the mobile terminal is matched with the mobile terminal X; if a mobile terminal which is matched with the mobile terminal X is found, send a success message respectively to the mobile terminal X and the mobile terminal which is matched with the mobile terminal X respectively for prompting that they are successfully matched with each other; upon a condition that the server receives identifiers of applications to be shared sent from one mobile terminal of the matched mobile terminals, determine whether the other mobile terminal of the matched mobile terminals is connected to the server; if the other mobile terminal is disconnected from the server, notify the one mobile terminal that the other mobile terminal is disconnected from matching; and if the other mobile terminal is online, obtain relevant information of the application corresponding to each identifier, and send the obtained relevant information to the other mobile terminal, where the relevant information at least includes a name and a download address of the application.

A mobile terminal includes: at least one processor, configured to execute a third processing module and a forth processing module.

The third processing module is configured to send, upon receipt of a share instruction, a match request to a server, the match request at least comprising a first time at which the mobile terminal X receives the share instruction.

The fourth processing module is configured to, after the server matches the mobile terminal where the fourth processing module is located and one mobile terminal of other mobile terminals according to the received match request and other match requests from the other mobile terminals, send an identifier of an application to be shared to the server; or receive relevant information of an application that is shared by the one mobile terminal and sent by the server, where the relevant information at least includes a name and a download address of the application.

A machine readable medium is provided, where an instruction set is saved therein, and when the instruction set is executed, the machine is enabled to execute the above mentioned method for sharing application information.

According to the above description, by using the solution of the present disclosure, users may match mobile terminals and share application information between the matched mobile terminals by only simple operations, such as giving a share instruction, which is very convenient and quick. In addition, because the matched mobile terminals are in sync with the substantial same time, information shared by one mobile terminal may be viewed by the other mobile terminal in a timely manner.

BRIEF DESCRIPTION OF THE DRAWINGS

FIG. 1 is a flowchart of a method for sharing application information according to an embodiment of the present disclosure;

DETAILED DESCRIPTION OF THE EMBODIMENTS

Figure 2:
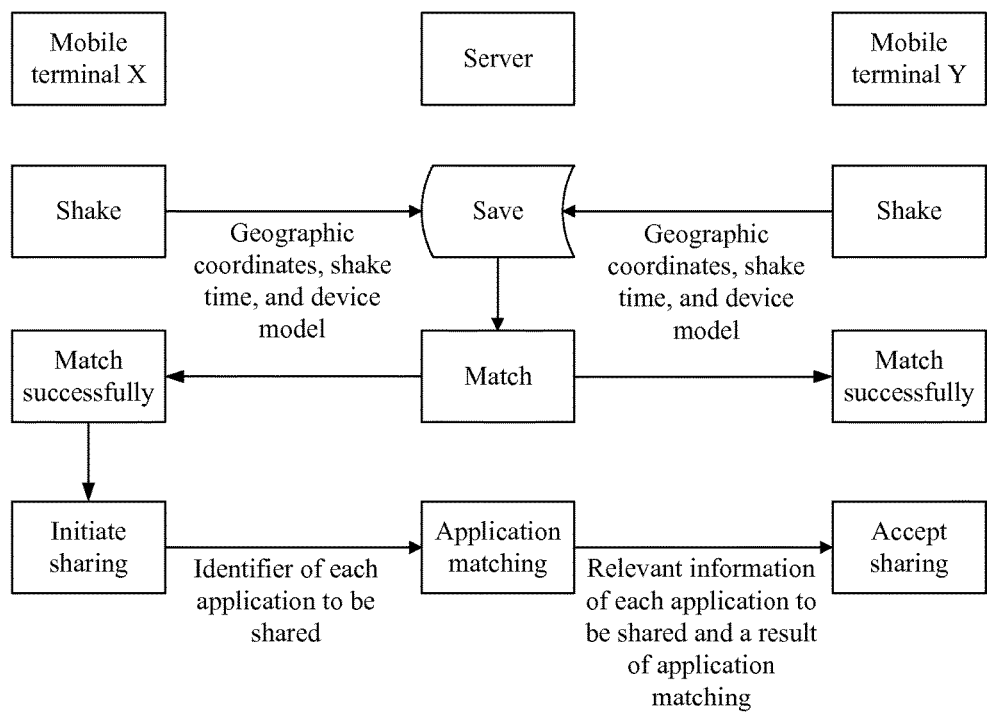
FIG. 2 is a schematic diagram of a process of sharing application information according to an embodiment of the present disclosure.

With respect to the technical problem in the prior art, the present disclosure proposes an improved solution for sharing application information.

To make the solutions of the present disclosure clearer, the solutions are further described in detail with reference to the accompanying drawings and embodiments.

FIG. 1 is a flowchart of a method for sharing application information according to an embodiment of the present disclosure. As shown in FIG. 1, the method comprises the following steps 11 to 13.

Step 11: a server receives a match request sent by a mobile terminal X upon receipt of a share instruction of a user, the match request at least comprising a first time at which the mobile terminal X receives the share instruction.

To facilitate the differentiation from other mobile terminals, the mobile terminal that sends the match request in step 11 is referred to as a mobile terminal X below.

The receipt of the share instruction of the user by the mobile terminal X may comprise that the mobile terminal X monitors the shake thereof performed by the user. For example, if the mobile terminal X monitors that it moves in left and right directions at a tilt angle greater than 30 degree for at least 3 times, it can be determined that the user sends the share instruction, and the user can be notified by a sound that the user has triggered the share instruction.

Instead of shaking, the share instruction may also be given to the mobile terminal X in other modes. For example, a button or a combination of buttons may be set on the mobile terminal X as a button for triggering a share instruction. When it is monitored that a user touches the button or the combination of buttons on an interface of an application, it may be determined that the user issues a share instruction. Alternatively, a button may be directly set on a physical keyboard or a virtual keyboard on the mobile terminal as a button for triggering sharing. Other possible modes will not be described one by one.

After it is determined that the user gives the share instruction, the mobile terminal X may send the match request to the server, wherein the match request at least includes the first time at which the mobile terminal X receives the share instruction, and on this basis, may further include one or more geographic coordinates of the mobile terminal X.

The geographic coordinates refer to coordinates of the Global Positioning System (GPS). It is the prior art about how the mobile terminal X obtains the geographic coordinates of itself. In addition, the first time refers to the time when the server receives the match request of the mobile terminal X, which is normally accurate within a millisecond.

Further, the match request, besides the geographic coordinates of the mobile terminal X and the first time, may further includes other information, such as a unique identifier of the mobile terminal X, so that the server may be aware of the identity of the mobile terminal X.

Step 12: the server saves the match request; determines, according to the saved match request and other match requests which are sent from other mobile terminals and saved in the server, whether there is a mobile terminal which is matched with the mobile terminal X among the other mobile terminals, wherein the step of determining whether there is a mobile terminal which is matched with the mobile terminal X among the other mobile terminals includes: if a time interval between a second time at which one mobile terminal of the other mobile terminals receives a share instruction of a user of the one mobile terminal and the first time is within a range [0, M], where M>0, determining that the mobile terminal is matched with the mobile terminal X; and if a mobile terminal which is matched with the mobile terminal X is found, sends a success message to the mobile terminal X and the mobile terminal which is matched with the mobile terminal X respectively for prompting that they are successfully matched with each other.

In this step, the server may save the match request sent by the mobile terminal X firstly, where the match request at least includes the first time, and as described above, may further include the one or more geographic coordinates of the mobile terminal X, etc.

Then, the server determines whether there is a mobile terminal that is matched with the mobile terminal X among the other mobile terminals that send the other match requests, which may be specifically implemented by:

1) where the match request sent by the mobile terminal X does not include the geographic coordinates of the mobile terminal X, if a time interval between a second time at which one mobile terminal of the other mobile terminals receives a share instruction of a user of the one mobile terminal and the first time is within the range [0, M], the server determines that the mobile terminal is matched with the mobile terminal X; and 2) where the match request sent by the mobile terminal X includes the geographic coordinates of the mobile terminal X, after determining that the time interval between the first time and the second time is within the range [0, M], the server further determines whether a distance between geographic coordinates in the match request sent by the mobile terminal and the geographic coordinates in the match request sent by the mobile terminal X is within a range [0, N], where N>0; and if the distance is within the range [0, N], the server determines that the mobile terminal is matched with the mobile terminal X.

Specific values of both M and N may be determined according to actual requirements. For example, a value of M may be 3 seconds, and a value of N may be 500 meters.

In an actual implementation process, the server may determine, during a preset duration T that starts from a time of receiving the match request sent by the mobile terminal X, whether there is a mobile terminal that matches with the mobile terminal X among the other mobile terminals that send the other match requests every preset interval of t, wherein t<T, and if a mobile terminal which is matched with the mobile terminal X is found, the server sends a success message to the mobile terminal X and the mobile terminal that is matched with the mobile terminal X respectively, and identifiers of the matched mobile terminals can be carried in the success message, so that the matched mobile terminals may be aware of each other's identity. If no mobile terminal that is matched with the mobile terminal X is found after the preset duration T, a failure message may be sent to the mobile terminal X for prompting that no mobile terminal is matched with the mobile terminal X. Specific values of both T and t may be determined according to actual requirements. For example, t may be 2 seconds, and T may be 20 seconds.

The following is an example.

When a server receives a match request sent by a mobile terminal X at 12:00:00, the server determines, at 12:00:00 and for the first time, whether there is a mobile terminal which is matched with the mobile terminal X among the other mobile terminals that send the other match requests; if a mobile terminal which is matched with the mobile terminal X is found, sends a success message to the mobile terminal X and the mobile terminal which is matched with the mobile terminal X respectively; if no mobile terminal which is matched with the mobile terminal X is found, determines again at 12:00:02 whether there is a mobile terminal which is matched with the mobile terminal X among the other mobile terminals; if a mobile terminal which is matched with the mobile terminal X is found, sends a success message to the mobile terminal X and the mobile terminal which is matched with the mobile terminal X respectively; if no mobile terminal which is matched with the mobile terminal X is found, determines once again at 12:00:04 whether there is a mobile terminal which is matched with the mobile terminal X among the other mobile terminals; this process continues, and if no mobile terminal which is matched with the mobile terminal X is found after 20 seconds, determines that the matching fails, and sends a failure message to the mobile terminal X.

The server can find one or more mobile terminals which are matched with the mobile terminal X.

Where there are multiple mobile terminals which are matched with the mobile terminal X, all the mobile terminals can be matched with the mobile terminal X; alternatively, the user of the mobile terminal X may select one of the mobile terminals for matching with the mobile terminal X; alternatively, the server may select one of them for matching with the mobile terminal X. No limitation is set to the specific implementation mode.

If the server performs the selection, the server may, before sending the success message to the mobile terminal X and the mobile terminal which is matched with the mobile terminal X respectively, need to determine whether there is more than one mobile terminal which is matched with the mobile terminal X. If only one mobile terminal which is matched with the mobile terminal X is found, the server respectively sends the success message to the mobile terminal X and the mobile terminal which is matched with the mobile terminal X. If more than one mobile terminal which is matched with the mobile terminal X is found, the server may select one mobile terminal from the mobile terminals which are matched with the mobile terminal X, where a time interval between a time at which the selected mobile terminal receives a share instruction of a user of the selected mobile terminal and the first time is shortest, match the selected mobile terminal with the mobile terminal X, and sends the success message to the mobile terminal X and the selected mobile terminal respectively.

The following is an example.

Assuming that a server determines that there are two mobile terminals which are matched with the mobile terminal X, such as a mobile terminal Y and a mobile terminal Z, where compared with the mobile terminal Z, a time interval between a third time at which the mobile terminal Y receives a share instruction of a user of the mobile terminal Y and the first time is shorter, then, the server determines that the mobile terminal Y is matched with the mobile terminal X.

It should be noted that the above examples are used merely for description purpose and are not intended to limit the technical solution of the present disclosure. For example, if there is more than one mobile terminal which is matched with the mobile terminal X, the server may also randomly select one mobile terminal for matching with the mobile terminal X.

Step 13: the server determines, upon a condition that the server receives identifiers of applications to be shared sent from one mobile terminal of the matched mobile terminals, whether the other mobile terminal of the matched mobile terminals is connected to the server; if the other mobile terminal of the matched mobile terminals is disconnected from the server, that is, the other mobile terminal is offline, notifies the one mobile terminal that the other mobile terminal is disconnected from matching; and if the other mobile terminal is online, the server obtains relevant information of an application corresponding to each identifier, and sends the obtained relevant information to the other mobile terminal, where the relevant information at least includes a name and a download address of the application.

In this step, when any one mobile terminal of the matched mobile terminals, that is, the mobile terminal X or the mobile terminal which is matched with the mobile terminal X, needs to share one or more applications installed thereon with another, it may send to the server the identifiers of the applications to be shared; correspondingly, the server will obtain relevant information of the application corresponding to each identifier, and send the obtained relevant information to the other mobile terminal, where the relevant information at least includes a name and a download address of the application, and may further include other information, such as a version number.

The following is an example embodiment.

When a mobile terminal X and a mobile terminal Y are matched with each other successfully, if a user X corresponding to the mobile terminal X wants to share an application installed on the mobile terminal X, the user X may open a selection interface of the mobile terminal X, where a list of all applications installed on the mobile terminal X, that is, a list of all applications that are locally installed is displayed; the user X may set each application in the list to be a selected or unselected state; meanwhile, a submit button may be displayed on the interface, and the mobile terminal X, when monitoring that the user X presses this button, may determine the applications in selected state in the list as the applications to be shared, which may be one or more applications, and send to a server an identifier of each application to be shared; the server obtains relevant information of application corresponding to each identifier, such as a name, a download address, and a version number of the application, and sends the obtained relevant information to the mobile terminal Y.

For this purpose, the server needs to record a corresponding relationship between the matching mobile terminals, for example, record that the mobile terminal X has been matched with the mobile terminal Y, thereby sending the relevant information of the application shared by the mobile terminal X to the mobile terminal Y.

Normally, the server may provide a function of downloading the applications installed on each mobile terminal Therefore, the server, after receiving the identifier of each application to be shared, may conveniently obtain the relevant information of the application corresponding to each identifier.

In addition, in an actual implementation process, each mobile terminal may further report device model information or operating system information thereof to the server, where the device model information or operating system information may be reported independently, and may also be reported together with the geographic coordinates and the time at which the mobile terminal receives a share instruction of a user of the mobile terminal, where no limitation is set thereto. Correspondingly, the server, before sending the obtained relevant information of each application to be shared to the other mobile terminal of the matched mobile terminals, may determine whether each application to be shared is applicable for the device model or operating system of the other mobile terminal of the matched mobile terminals, that is, perform application matching; and when sending the obtained relevant information of each application to be shared to the other mobile terminal of the matched mobile terminals, mark an application that is not applicable for the device model or operating system of the other mobile terminal of the matched mobile terminals, so that the user of the recipient may obviously determine, among the received relevant information of each application, the applications that are applicable for the mobile terminal thereof, and the applications that are not applicable for the mobile terminal thereof. No limitation is set to the mode of marking the application that is not applicable for the device model or operating system of the other mobile terminal of the matched mobile terminals, as long as the user can identify the meaning of the marking.

For the matched mobile terminals, any one mobile terminal may be a share-initiating mobile terminal or a share-receiving mobile terminal That is, they may, besides sending relevant information of an application thereof to the other mobile terminal, may also receive relevant information of an application shared by the other mobile terminal. The user of the receiving mobile terminal, after receiving the relevant information of the shared application, may select one or more applications shared by the share-initiating mobile terminal for downloading and installation under the consideration of the local requirement and the list of applications installed locally.

The above processes are described as follows by using an example.

FIG. 2 is a schematic diagram of a process of sharing application information according to the present disclosure. As shown in FIG. 2, where a user X corresponding to a mobile terminal X and a user Y corresponding to a mobile terminal Y are colleagues, when the user X wants to share two applications installed on the mobile terminal X to the user Y, the user X and the user Y may shake the mobile terminal X and the mobile terminal Y within a short distance, for example, facing each other. In such cases, the mobile terminal X will send a piece of match request to a server, which may comprise one or more geographic coordinates, shaking time and device model of the mobile terminal X and the like; similarly, the mobile terminal Y will also send a piece of match request to the server, which may comprise one or more geographic coordinates, shaking time and device model of the mobile terminal Y, and the like. The server saves the received match request, and matches the mobile terminal X with the mobile terminal Y. After a successful match, the mobile terminal X may report an identifier of each application to be shared selected by the user X; correspondingly, the server obtains relevant information of the application corresponding to each identifier, and determines whether the application corresponding to each identifier is applicable for the device model of the mobile terminal Y, that is, performs an application matching. Finally, the server sends the obtained relevant information of the applications to be shared and an application matching result to the mobile terminal Y.

So far, the method embodiments of the present disclosure are described.

It is obvious that, by using the solutions according to the above method embodiments, users may realize the matching between mobile terminals and share application information between the matched mobile terminals by only simple operations, such as giving a share instruction, which is very convenient and quick. In addition, because the matched mobile terminals are in sync with the substantial same time, information shared by one mobile terminal may be viewed by the other mobile terminal in a timely manner.

Figure 3:
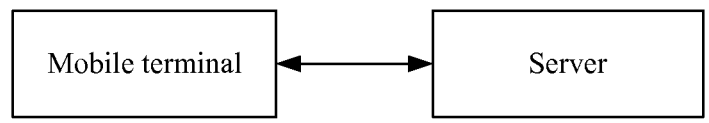
FIG. 3 is a schematic structural diagram of a system for sharing application information according to an embodiment of the present disclosure.

Based on the above description, FIG. 3 is a schematic structural diagram of a system for sharing application information according to an embodiment of the present disclosure, which, as shown in FIG. 3, includes a mobile terminal and a server, where there are at least two mobile terminals. For the purpose of simplifying the figure, FIG. 3 shows only one mobile terminal.

Each mobile terminal X is configured to send, upon receipt of a share instruction of a user, a match request to the server, the match request at least comprising a first time at which the mobile terminal X receives the share instruction.

The server is configured to save the match request sent by the mobile terminal X; according to the saved match request and other match requests which are sent from other mobile terminals and saved in the server, determine whether there is a mobile terminal which is matched with the mobile terminal X among the other mobile terminals, wherein the determine whether there is a mobile terminal which is matched with the mobile terminal X among the other mobile terminals includes: if a time interval between a second time at which one mobile terminal of the other mobile terminals receives a share instruction of a user of the one mobile terminal and the first time is within a range [0, M], where M>0, determining that the mobile terminal is matched with the mobile terminal X; if a mobile terminal which is matched with the mobile terminal X is found, send a success message to the mobile terminal X and the mobile terminal which is matched with the mobile terminal X respectively, for prompting that they are successfully matched with each other; upon a condition that the server receives identifiers of applications to be shared sent from one mobile terminal of the matched mobile terminals, determine whether the other mobile terminal of the matched mobile terminals is connected to the server; if the other mobile terminal of the matched mobile terminals is disconnected from the server, that is, the other mobile terminal of the matched mobile terminals is offline, notify the one mobile terminal that the other mobile terminal of the matched mobile terminals is disconnected from matching; and if the other mobile terminal of the matched mobile terminals is online, obtain relevant information of the application corresponding to each identifier, and send the obtained relevant information to the other mobile terminal, where the relevant information at least includes a name and a download address of the application.

The match request sent by the mobile terminal X may further include one or more geographic coordinates of the mobile terminal X. Correspondingly, the server may further be configured to determine, if it is determined that the time interval between the second time and the first time is within the range [0, M], whether a distance between geographic coordinates in the match request sent by the mobile terminal and the geographic coordinates in the match request sent by the mobile terminal X is within a range [0, N], where N>0; and if the distance is within the range [0, N], determine that the mobile terminal is matched with the mobile terminal X.

Figure 4:
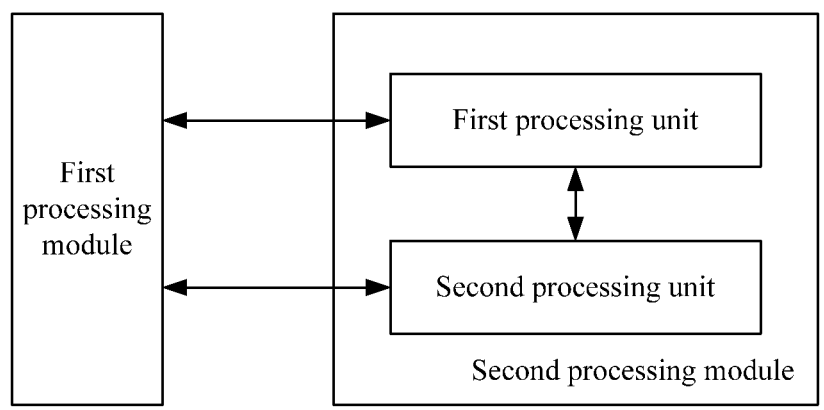
FIG. 4 is a schematic structural diagram of a server according to an embodiment of the present disclosure.

FIG. 4 is a schematic structural diagram of a server according to an embodiment of the present disclosure. As shown in FIG. 4, the server includes:

a first processing module, configured to, every time a match request sent by a mobile terminal X upon receipt of a share instruction of a user is received, send the match request to a second processing module, and inform the second processing module to perform functions thereof, where the match request at least includes a first time at which the mobile terminal X receives the share instruction; and the second processing module, configured to save the match request; according to the saved match request and other match requests which are sent from other mobile terminals and saved in the server, determine whether there is a mobile terminal which is matched with the mobile terminal X among the other mobile terminals; if a mobile terminal which is matched with the mobile terminal X is found, send a success message to the mobile terminal X and the mobile terminal which is matched with the mobile terminal X respectively for prompting that they are successfully matched with each other; where the determine whether there is a mobile terminal which is matched with the mobile terminal X among the other mobile terminals includes: if a time interval between a second time at which one mobile terminal of the other mobile terminals receives a share instruction of a user of the one mobile terminal and the first time is within a range [0, M], where M>0, determine that the mobile terminal is matched with the mobile terminal X; upon a condition that the server receives identifiers of applications to be shared sent from one mobile terminal of the matched mobile terminals, determine whether the other mobile terminal of the matched mobile terminals is connected to the server; if the other mobile terminal of the matched mobile terminals is disconnected from the server, that is, the other mobile terminal of the matched mobile terminals is offline, notify the one mobile terminal that the other mobile terminal of the matched mobile terminals is disconnected from matching; and if the other mobile terminal of the matched mobile terminals is online, obtain relevant information of the application corresponding to each identifier, and send the obtained relevant information to the other mobile terminal, where the relevant information at least includes a name and a download address of the application.

The match request sent by the mobile terminal X may further include one or more geographic coordinates of the mobile terminal X. Correspondingly, the second processing module may further be configured to determine, if it is determined that the time interval between the first time and the second time is within the range [0, M], whether a distance between geographic coordinates in the match request sent by the mobile terminal and the geographic coordinates in the match request sent by the mobile terminal X is within a range [0, N], where N>0; and if the distance is within the range [0, N], determine that the mobile terminal is matched with the mobile terminal X.

As shown in FIG. 4, the second processing module may specifically include:

a first processing unit, configured to save the match request sent by the mobile terminal X, and determine, during a preset duration T that starts from a time of receiving the match request sent by the mobile terminal X, whether there is a mobile terminal which is matched with the mobile terminal X among the other mobile terminals every preset interval of t, wherein t<T; and if a mobile terminal which is matched with the mobile terminal X is found, send a success message to the mobile terminal X and the mobile terminal which is matched with the mobile terminal X respectively; and a second processing unit, configured to determine, upon a condition that the server receives identifiers of applications to be shared sent from one mobile terminal of the matched mobile terminals, whether the other mobile terminal of the matched mobile terminals is connected to the server; if the other mobile terminal of the matched mobile terminals is disconnected from the server, that is, the other mobile terminal of the matched mobile terminals is offline, notify the one mobile terminal that the other mobile terminal of the matched mobile terminals is disconnected from matching; and if the other mobile terminal of the matched mobile terminals is online, obtain relevant information of an application corresponding to each identifier, and send the obtained relevant information to the other mobile terminal.

The first processing unit may be further configured to determine, before sending the success message respectively to the mobile terminal X and the mobile terminal which is matched with the mobile terminal X, whether there is more than one mobile terminal which is matched with the mobile terminal X; if only one mobile terminal which is matched with the mobile terminal X is found, send the success message to the mobile terminal X and the mobile terminal which is matched the mobile terminal X respectively; if more than one mobile terminal which is matched with the mobile terminal X is found, select one mobile terminal from the mobile terminals which are matched with the mobile terminal X, where a time interval between a third time at which the selected mobile terminal receives a share instruction of a user of the selected mobile terminal and the first time is shortest, match the selected mobile terminal with the mobile terminal X, and send the success message to the mobile terminal X and the selected mobile terminal respectively.

Figure 5:
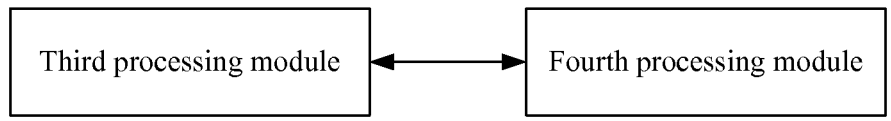
FIG. 5 is a schematic structural diagram of a mobile terminal according to an embodiment of the present disclosure.

In addition, the first processing module may be further configured to receive device model information or operating system information of each mobile terminal sent from each mobile terminal, and send the information to the second processing unit. Correspondingly, the second processing unit may be further configured to determine, before sending the obtained relevant information to the other mobile terminal, whether an application corresponding to each identifier is applicable for a device model or an operating system of the other mobile terminal; and when sending the obtained relevant information to the other mobile terminal, mark the relevant information of the application which is not applicable for the device model or the operating system of the other mobile terminal FIG. 5 is a schematic structural diagram of a mobile terminal according to an embodiment of the present disclosure. As shown in FIG. 5, the mobile terminal includes:

a third processing module, configured to send, upon receipt of a share instruction of a user, a match request to the server, the match request at least comprising a first time at which the mobile terminal X receives the share instruction; and a fourth processing module, configured to, after the server matches the mobile terminal where the fourth processing module is located and one mobile terminal of other mobile terminals according to the received match request and other match requests which are sent from the other mobile terminals and saved in the server, send an identifier of an application to be shared to the server; or receive relevant information of an application that is shared by the one mobile terminal and sent by the server, where the relevant information at least includes a name and a download address of the application.

The match request may further include one or more geographic coordinates of the mobile terminal where the third processing module is located.

Corresponding description of the above method embodiments may be referred to for specific operating processes of the system and apparatus embodiments shown in FIGS. 3-5, and will not be described repeatedly herein.

An embodiment of the present disclosure further provides an device for sharing application information, which includes a memory configured to store instructions, and a processor that is coupled with the memory. The processor is configured to execute the instructions stored in the memory, and is configured to execute various implementation modes of the above method for sharing application information. In addition, an embodiment of the present disclosure further provides a machine readable medium, where an instruction set is stored on the machine readable medium, and when the instruction set is executed, the machine may execute various implementation modes of the above method for sharing application information. The machine readable medium may include a non-transitory storage medium that is configured to store at least part of the instruction set.

It is obvious that, by using the solutions according to the above system and apparatus embodiments, users may match mobile terminals and share application information between the matched mobile terminals by only simple operations, such as giving a share instruction, which is very convenient and quick. In addition, because the matched mobile terminals are in sync with the substantial same time, information shared by one mobile terminal may be viewed by the other mobile terminal in a timely manner.

The above are merely example embodiments of the present disclosure. However, the scope of the present disclosure is not limited thereto. All modifications, equivalent replacements and improvements made without departing from the spirit and principle of the present disclosure shall fall within the protection scope of the present disclosure.

The invention claimed is:

1. A method for sharing application information among mobile devices comprising:
receiving, by a server comprising a processor, a match request sent by a mobile terminal X upon receipt of a share instruction, the match request at least comprising information indicative of a first time at which the mobile terminal X receives the share instruction;
saving, by the server, the match request; and according to the saved match request and other saved match requests from other mobile terminals, determining, by the server, whether there is a mobile terminal, among the other mobile terminals, that is matched with the mobile terminal X, wherein determining whether there is a match comprises: if a time interval between a second time at which one mobile terminal of the other mobile terminals receives a share instruction and the first time is within a range [0, M], wherein M>0, determining that the one mobile terminal is matched with the mobile terminal X; and if a mobile terminal that is matched with the mobile terminal X is found, sending a success message respectively to the mobile terminal X and to the mobile terminal that is matched with the mobile terminal X, indicating that they are successfully matched with each other; and upon a condition that the server receives identifiers of applications to be shared and sent from one mobile terminal of the matched mobile terminals constituted by the mobile terminal X and the mobile terminal that is matched with the mobile terminal X, determining, by the server, whether the other mobile terminal of the matched mobile terminals is connected to the server; and if the other mobile terminal of the matched mobile terminals is disconnected from the server, notifying the one mobile terminal that the other mobile terminal of the matched mobile terminals is disconnected from matching; and if the other mobile terminal of the matched mobile terminals is online, obtaining, by the server, relevant information of the application corresponding to each identifier, and sending the obtained relevant information to the other mobile terminal of the matched mobile terminals, wherein the relevant information at least comprises a name and a download address of the application.

2. The method according to claim 1, wherein:
the match request sent by the mobile terminal X further comprises one or more geographic coordinates of the mobile terminal X, and
if the time interval between the first time and the second time is within the range [0, M], determining by the server whether a distance between geographic coordinates in the match request sent by the mobile terminal X and the geographic coordinates of the mobile terminal that is matched with the mobile terminal X is within a range [0, N], wherein N>0; and if the distance is within the range [0, N], determining that the mobile terminal is matched with the mobile terminal X.

3. The method according to claim 1, wherein determining whether there is a mobile terminal among the other mobile terminals that is matched with the mobile terminal X comprises determining, during a preset duration T that starts from a time of receiving the match request sent by the mobile terminal X, whether there is a mobile terminal that is matched with the mobile terminal X among the other mobile terminals during each preset interval of t, wherein t<T.

4. The method according to claim 3, further comprising:
if no mobile terminal that is matched with the mobile terminal X is found after the preset duration T, sending a failure message to the mobile terminal X for indicating that no mobile terminal is matched with the mobile terminal X.

5. The method according to claim 1, wherein before sending the success message respectively to the mobile terminal X and the mobile terminal which is matched with the mobile terminal X, determining whether there is more than one mobile terminal that is matched with the mobile terminal X, and if only one mobile terminal that is matched with the mobile terminal X is found, sending the success message respectively to the mobile terminal X and the mobile terminal that is matched with the mobile terminal X; and
if more than one mobile terminal that is matched with the mobile terminal X is found, selecting one mobile terminal from the mobile terminals which are matched with the mobile terminal X, wherein a time interval between a third time at which the selected mobile terminal receives a share instruction and the first time is shortest, and sending the success message respectively to the mobile terminal X and the selected mobile terminal.

6. The method according to claim 1, further comprising:
receiving, by the server, device model information or operating system information of each mobile terminal sent by each mobile terminal; and
before sending the obtained relevant information to the other mobile terminal, determining whether an application corresponding to each identifier is applicable for a device model or an operating system of the other mobile terminal of the matched mobile terminals; and
when the server sends the obtained relevant information to the other mobile terminal of the matched mobile terminals, marking relevant information of an application that is not applicable for the device model or the operating system of the other mobile terminal of the matched mobile terminals.

7. The method according to claim 1, wherein the receipt of the share instruction is initiated by the mobile terminal X when the mobile terminal X detects a shaking of the mobile terminal X.

8. A system for sharing application information, comprising at least two mobile terminals and a server, wherein:
each mobile terminal X is configured to send, upon receipt of a share instruction, a match request to the server, the match request at least comprising information indicative a first time at which the mobile terminal X receives the share instruction; and
the server is configured to,
receive the match request;
save the match request;
determine whether there is a mobile terminal that is matched with the mobile terminal X among the other mobile terminals according to the saved match request and other saved match requests from other mobile terminals, wherein the determination of whether there is a mobile terminal that is matched with the mobile terminal X among the other mobile terminals comprises: if a time interval between a second time at which one mobile terminal of the other mobile terminals receives a share instruction and the first time is within a range [0, M], wherein M>0, determine that the one mobile terminal is matched with the mobile terminal X; and
if a mobile terminal that is matched with the mobile terminal X is found, send a success message to the mobile terminal X and the mobile terminal which is matched with the mobile terminal X respectively, indicating that they are successfully matched with each other;
upon a condition that the server receives identifiers of applications to be shared sent from one mobile terminal of the matched mobile terminals constituted by the mobile terminal X and the mobile terminal that is matched with the mobile terminal X, determine whether the other mobile terminal of the matched mobile terminals is connected to the server; if the other mobile terminal of the matched mobile terminals is disconnected from the server, notify the one mobile terminal that the other mobile terminal of the matched mobile terminals is disconnected from matching; and if the other mobile terminal of the matched mobile terminals is online, obtain relevant information of the application corresponding to each identifier, and send the obtained relevant information to the other mobile terminal, wherein the relevant information at least comprises a name and a download address of the application.

9. The system according to claim 8, wherein
the match request sent by the mobile terminal X further comprises one or more geographic coordinates of the mobile terminal X; and
the server is further configured to, upon a condition of determining that the time interval between the second time and the first time is within the range [0, M], determine whether a distance between geographic coordinates in the match request sent by the mobile terminal X and the geographic coordinates of the mobile terminal that is matched with the mobile terminal X is within a range [0, N], wherein N>0; and if the distance is within the range [0, N], determine that the mobile terminal is matched with the mobile terminal X.

10. A server, comprising:
at least one processor, configured to execute a first processing module and a second processing module, wherein
the first processing module is configured to, every time a match request sent by a mobile terminal X upon receipt of a share instruction is received, send the match request to the second processing module, and inform the second processing module to perform functions thereof, wherein the match request at least comprises information indicative a first time at which the mobile terminal X receives the share instruction; and
the second processing module is configured to
save the match request;
according to the saved match request and other saved match requests from other mobile terminals, determine whether there is a mobile terminal that is matched with the mobile terminal X among the other mobile terminals, wherein the determination of whether there is a mobile terminal that is matched with the mobile terminal X among the other mobile terminals comprises:
if a time interval between a second time at which one mobile terminal of the other mobile terminals receives a share instruction and the first time is within a range [0, M], wherein M>0, determine that the one mobile terminal is matched with the mobile terminal X;
if a mobile terminal that is matched with the mobile terminal X is found, send a success message respectively to the mobile terminal X and the mobile terminal that is matched with the mobile terminal X respectively, indicating that they are successfully matched with each other; and
upon a condition that the server receives identifiers of applications to be shared sent from one mobile terminal of the matched mobile terminals constituted by the mobile terminal X and the mobile terminal that is matched with the mobile terminal X, determine whether the other mobile terminal of the matched mobile terminals is connected to the server; if the other mobile terminal of the matched mobile terminals is disconnected from the server, notify the one mobile terminal that the other mobile terminal of the matched mobile terminals is disconnected from matching; and if the other mobile terminal of the matched mobile terminals is online, obtain relevant information of the application corresponding to each identifier, and send the obtained relevant information to the other mobile terminal, wherein the relevant information at least comprises a name and a download address of the application.

11. The server according to claim 10, wherein
the match request sent by the mobile terminal X further comprises one or more geographic coordinates of the mobile terminal X; and
the second processing module is further configured to, upon a condition of determining that the first time and the second time is within the range [0, M], determine whether a distance between geographic coordinates in the match request sent by the mobile terminal X and the geographic coordinates of the mobile terminal that is matched with the mobile terminal X is within a range [0, N], wherein N>0; and if the distance is within the range [0, N], determine that the mobile terminal is matched with the mobile terminal X.

12. The server according to claim 10, wherein the second processing module comprises:
a first processing unit, configured to save the match request sent by the mobile terminal X, and determine, during a preset duration T that starts from a time of receiving the match request sent by the mobile terminal X, whether there is a mobile terminal that is matched with the mobile terminal X among the other mobile terminals during each preset interval of t, wherein t<T; and if a mobile terminal that is matched with the mobile terminal X is found, send a success message to the mobile terminal X and the mobile terminal that is matched with the mobile terminal X respectively; and
a second processing unit, configured to determine, upon a condition that the server receives identifiers of applications to be shared sent from one mobile terminal of the matched mobile terminals constituted by the mobile terminal X and the mobile terminal that is matched with the mobile terminal X, whether the other mobile terminal of the matched mobile terminals is connected to the server; if the other mobile terminal of the matched mobile terminals is disconnected from the server, notify the one mobile terminal that the other mobile terminal of the matched mobile terminals is disconnected from matching; and if the other mobile terminal of the matched mobile terminals is online, obtain relevant information of an application corresponding to each identifier, and send the obtained relevant information to the other mobile terminal.

13. The server according to claim 12, wherein
the first processing unit is further configured to determine, before sending the success message to the mobile terminal X and the mobile terminal that is matched with the mobile terminal X respectively, whether there is more than one mobile terminal that is matched with the mobile terminal X; if only one mobile terminal that is matched with the mobile terminal X is found, send the success message to the mobile terminal X and the mobile terminal that is matched with the mobile terminal X respectively; if more than one mobile terminal that is matched with the mobile terminal X is found, select one mobile terminal from the mobile terminals which are matched with the mobile terminal X, wherein a time interval between a third time at which the selected mobile terminal receives a share instruction and the first time is shortest, match the selected mobile terminal with the mobile terminal X, and send the success message to the mobile terminal X and the selected mobile terminal respectively.

14. The server according to claim 12, wherein
the first processing module is further configured to receive device model information or operating system information of each mobile terminal sent from each mobile terminal, and send the information to the second processing unit; and the second processing unit is further configured to, before sending the obtained relevant information to the other mobile terminal, determine whether an application corresponding to each identifier is applicable for a device model or an operating system of the other mobile terminal; and when sending the obtained relevant information to the other mobile terminal, mark relevant information of the application not applicable for the device model or the operating system of the other mobile terminal.

15. A non-transitory machine readable medium storing instructions for directing a method of sharing application information, wherein an instruction set is stored therein, and when the instruction set is executed by at least one processor, performs a method comprising:

receiving, by a server, a match request sent by a mobile terminal X upon receipt of a share instruction, the match request at least comprising information indicative a first time at which the mobile terminal X receives the share instruction;

saving, by the server, the match request; and according to the saved match request and other saved match requests from other mobile terminals, determining, by the server, whether there is a mobile terminal that is matched with the mobile terminal X among the other mobile terminals, wherein determining whether there is a mobile terminal that is matched with the mobile terminal X among the other mobile terminals comprises: if a time interval between a second time at which one mobile terminal of the other mobile terminals receives a share instruction and the first time is within a range [0, M], wherein M>0, determining that the mobile terminal is matched with the mobile terminal X; and if a mobile terminal that is matched with the mobile terminal X is found, sending a success message to the mobile terminal X and the mobile terminal that is matched with the mobile terminal X respectively, indicating that they are successfully matched with each other; and upon a condition that the server receives identifiers of applications to be shared and sent from one mobile terminal of the matched mobile terminals constituted by the mobile terminal X and the mobile terminal that is matched with the mobile terminal X, determining, by the server, whether the other mobile terminal of the matched mobile terminals is connected to the server; if the other mobile terminal of the matched mobile terminals is disconnected from the server, notifying the one mobile terminal that the other mobile terminal of the matched mobile terminals is disconnected from matching; and if the other mobile terminal of the matched mobile terminals is online, obtaining, by the server, relevant information of the application corresponding to each identifier, and sending the obtained relevant information to the other mobile terminal of the matched mobile terminals, wherein the relevant information at least comprises a name and a download address of the application.

* * * * *